United States Patent [19]

Hütter

[11] 4,197,056
[45] Apr. 8, 1980

[54] WIND-DRIVEN POWER PLANT

[76] Inventor: Ulrich Hütter, Schlierbacherstrasse 93, D7312 Kirchheim, Teck, Fed. Rep. of Germany

[21] Appl. No.: 935,558

[22] Filed: Aug. 21, 1978

[30] Foreign Application Priority Data

Aug. 22, 1977 [DE] Fed. Rep. of Germany ....... 2737767

[51] Int. Cl.² .......................... F03D 1/00; F03D 11/04
[52] U.S. Cl. .................................. 416/132 B; 416/142
[58] Field of Search ..................... 416/132 B, 142, 99, 416/121 A, 122 A

[56] References Cited

U.S. PATENT DOCUMENTS

| 756,616 | 4/1904 | Fornander | 416/142 X |
| 2,484,291 | 10/1949 | Hays | 416/132 B X |

FOREIGN PATENT DOCUMENTS

| 2558848 | 9/1976 | Fed. Rep. of Germany | 416/16 |
| 907290 | 3/1946 | France | 416/99 |
| 40533 | 12/1957 | Poland | 416/132 B |
| 211766 | 2/1924 | United Kingdom | 416/122 |

*Primary Examiner*—Everette A. Powell, Jr.
*Attorney, Agent, or Firm*—Martin A. Farber

[57] ABSTRACT

Wind-driven power plant comprising a rotor with any desired number of blades and rotating during operation in an at least approximately vertical plane, the individual blades of the rotor being attached by means of articulations to a hub, which hub is fastened to the rotor shaft, the hub being mounted in a head of the plant which is carried by a tower at a height above the ground which is greater than the length of the rotor blades. The rotor is mounted in a head part, the latter swinging into a vertical position when the plant is at standstill; the rotor blades are swung around their articulations when the plant is at standstill up to a position which is at least approximately vertical; and the ends of the rotor blades are kinematically coupled for joint swinging motion with the swingable head part.

5 Claims, 3 Drawing Figures

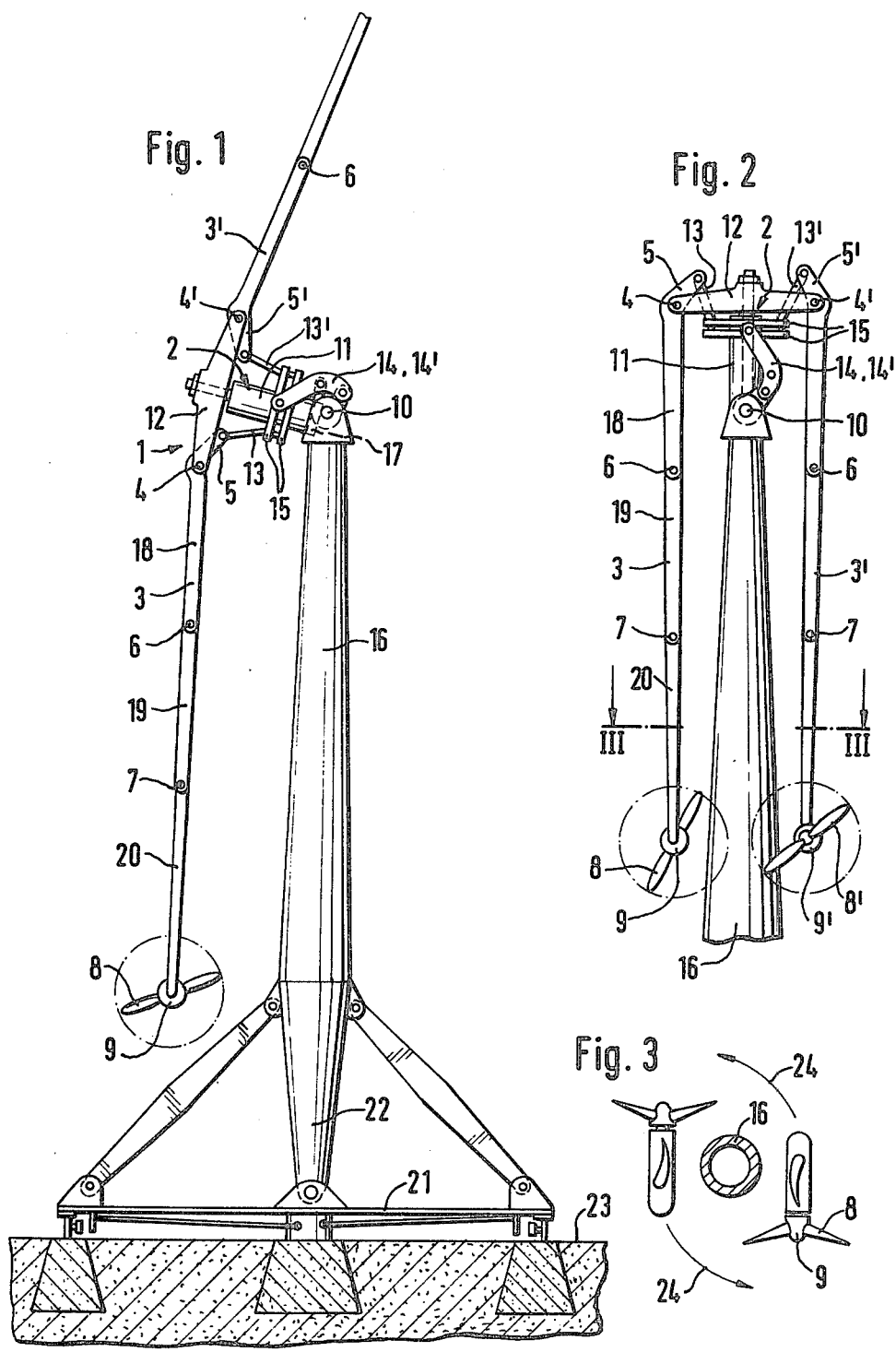

WIND-DRIVEN POWER PLANT

This invention refers to a plant for converting the kinetic energy of the wind into mechanical or electrical energy, preferably in the megawatt range. It is already known in such wind-driven power plants to connect the blades of a rotor, swingably through a certain angle, to a hub by means of articulations, the hub being attached to the rotor shaft, the rotor during operation rotating in an at least approximately vertical plane, so that the rotor blades can adjust or align themselves in the resultant direction of the force formed by the force of the air resistance which occurs in operation and the centrifugal force, and are thus substantially relieved of root or radical bending moments perpendicular to the plane of rotation. However, this known measure is not capable of overcoming the difficulties which occur in the transportation and mounting of the rotor blades, in the case of larger wind-driven power plants for energy conversion in the megawatt range, with lengths, e.g. of more than 50 meters. Already transportation on the highway of such long structural parts namely can only be effected with expensive special vehicles and corresponding blocking measures. In addition, particularly in the case of rotors having two or more blades, the attachment of such blades one after the other to a hub represents a complicated assembly job, since after the attachment of the first blade in approximately vertical position, the rotor must be turned by the application of a high moment of rotation up to 180° for the attachment of further blades before another rotor blade can be attached in vertical position to the hub.

The object of the invention in particular is to overcome the above mentioned difficulties both with respect to the assembling and with respect to the transportation of wind-driven power plants for conversion of energy particularly in the megawatt range and at the same time to improve the economy of such plants by reducing the required weight of their structural parts, which is extremely important in view of the shortage which will confront us in the near future of energy obtained from fossil materials, such as, e.g., petroleum and natural gas. These objects are achieved in the wind-driven power plant according to the invention substantially by the combination of and the following features:

(a) the rotor (1) is mounted in a head part (2), the latter swinging into a vertical position when the plant is at standstill, (b) the rotor blades (3, 3') are swung around their articulations (4, 4') when the plant is at standstill up into a position which is at least approximately vertical, and (c) the ends (5, 5') of the rotor blades (3, 3') are kinematically coupled for joint swinging motion with the swingable head part (2).

With such a development of the plant, any number of rotor blades can be attached all one after the other in vertical position to a hub, the latter being fastened on the rotor shaft without having to turn the hub together with the shaft in between. By means of the mechanicalkinematic coupling between the swinging movements of the rotor blades about their connecting joints with the hub and the swinging movements of the head part, which head part rotatably carries the rotor shaft, from out of the vertical position of the head part when the plant is at a standstill or shut down, into an at least approximately horizontal operating position, assurance is provided that the rotor blades, even in all intermediate positions which occur upon the starting and stopping of the plant, cannot strike a tower which carries the head of the plant at the required height above the ground.

It lies within the scope of the invention to use an auxiliary-force actuating device in order to assist the swinging movements of the rotor blades and of the head part upon the starting and/or stopping of the plants or systems, particularly plants of very large dimensions, e.g., in the form of hydraulic work cylinders or the like, in order to accelerate the starting and stopping times.

Another essential simplification in transportation and mounting of the rotor blades is obtained with the wind-driven power plant according to the invention by the fact that each of the rotor blades comprises several parts which are connected together by articulations, the latter—particularly in the partial-load range—being movable perpendicularly to the plane of rotation of the rotor, yet being flexurally rigid (bending-stiff) and nonrotatable in the direction perpendicular thereto. Such a subdivision of the rotor blades creates the possibility of transporting even the blades of plants having very large rotor diameters of far more than 100 meters without any great difficulty from their place of manufacture to the place of location of the plant and of assembling the plant only during the final installation. At the same time, due to the arrangement of such articulations in the rotor blades, the flexural or bending stress thereon during operation and thus also their weight can again be considerably reduced.

The total weight necessary in accordance with the invention for the construction of an energy conversion plant in accordance with the invention can furthermore be reduced in the manner that secondary rotors—in per se known manner—are arranged on the rotor blades in a region close to their tips, the shafts of the secondary rotors at least in the partial-load range being disposed in the plane of rotation of the main rotor, the shafts serving to drive energy transformers, particularly energy generators. With such a formation of the plant, a mechanical step-up gearing or transmission can be entirely dispensed between the main rotor, the latter rotating with the relatively low speed of rotation of less than 10 rpm, and an energy transformer, preferably in the form of an electric generator, which transformer is driven by the main rotor, since the secondary rotors which are arranged in the region of the main rotor blades, which region is close to their tips, operate with a much higher speed of rotation and therefore can be coupled directly with corresponding energy transformers. By equipping the blades of the main rotor with such secondary rotors there is simultaneously obtained the advantageous possibility of causing external energy to act on these secondary rotors and of using these rotors in this manner in propeller operation for the starting of the main rotor from its standstill position.

A description of one illustrative embodiment is given below with reference to the drawing, which contains three figures and in which:

FIG. 1 shows a wind-driven power plant in accordance with the invention, in a side view with a two-blade rotor in operating position, and the swingable part of the plant head, which part serves as a mounting or bearing for the rotor shaft;

FIG. 2 shows the upper part of the same wind-driven power plant, also in side view, with rotor blades and swingable head part of the plant in the standstill position, and FIG. 3 is a section along the line III—III of FIG. 2.

With the large wind-driven power plant for the conversion of energy in the megawatt range which is shown in the drawing, the rotor 1, which is adapted to be driven by the kinetic energy of the wind, is rotatably mounted in a part 2 of the head of plant, which part is swingable around a horizontal shaft 10. On the hub 12 which is fastened to the rotor shaft 11, the rotor blades 3, 3' are pivoted so as to be swingable by approximately 90° around articulations 4, 4' (the axes of which articulations lie in the plane of rotation of the rotor) between the operating position of the rotor blades which is shown in FIG. 1 and a position at rest, shown in FIGS. 2 and 3, when the plant is at a standstill. The pivotal movements of the rotor blades 3, 3' around their articulations 4, 4' and the pivotal movements of the head part 2 of the plant around the horizontal axle 10 are so coupled with each other kinematically by means of bars 13, 13' and 14, 14', respectively, and by an intermediate part 15, which intermediate part makes a mutual or opposite rotation possible, such that upon the transition of the plant from the position of rest shown in FIGS. 2 and 3 into the operating position of the rotor 1 and of the swingable head part 2 of the plant shown in FIG. 1, a striking of the rotor blades 3, 3' against the tower 16 which supports the system at the necessary distance above the ground 23, is definitely prevented. In order to shorten the periods of time required for the starting and stopping of the plant, additional setting or displacement devices are suitably provided, which devices are actuated by auxiliary force, the devices, e.g., being in the form of hydraulic working cylinders 17 or the like.

With wind-driven power plants in accordance with the invention with a length of the individual rotor blades 3, 3' in excess, e.g., of 20 meters, these rotor blades, in order to simplify the manufacture, transportation to the location of the plant, and installation, as well as in order to reduce the flexural or bending stress of the blades perpendicular to the axis of rotation of the rotor and thus also their weight, are manufactured in several— e.g., three-parts 18, 19, 20, which parts are connected by means of hinge joints 6, 7 with pivot axes, the latter lying in the plane of the rotor. Only upon the final installation, do these parts need to be lifted in vertical position one after the other and they can be attached to the rotor hub 12 while the latter is in the standstill position shown in FIG. 2.

By attaching secondary rotors 8, 8' of relatively small diameter and considerably higher speed of rotation in operation in comparison to the main rotor, in the vicinity of the rotor blades 3, 3' which is close to their tips, the required weight and the dimensions, in particular, of the plant head, can be considerably further reduced as a result of the elimination of a gearing or transmission between the main rotor and an energy transformer driven by the main rotor, since the high-speed secondary rotors 8, 8' can be coupled, either directly or via a gearing or transmission having a relatively small step-up ratio, to the corresponding energy transformers 9, 9', the latter preferably being in the form of electric generators. The secondary rotors 8, 8' are in this connection advantageously to be used additionally for the particularly simple starting of the plant from its standstill position shown in FIGS. 2 and 3 into the operating position shown in FIG. 1. For this purpose, the rotors 8, 8' are driven as propellers by their energy transformers 9, 9', the latter being supplied with external energy, and in this connection the rotors 8, 8' exert a moment on the main rotor 1, which places the main rotor in rotation initially in the direction of the arrows 24 with the head part 2 and the shaft 11 disposed in the vertical position. Upon an increase in the speed of rotation of the main rotor, the rotor blades 3, 3' are swung by the centrifugal forces which act on them out of their position of rest according to FIGS. 2 and 3 into the operating position shown in FIG. 1, and as a result of the kinematic coupling, simultaneously the head part 2 with the rotor shaft 11 is swung into its operating position with at least an approximately horizontal position of the rotor shaft 11, in which position the rotor 1 which is rotating in an approximately vertical plane, is fully hit by the flow of air.

In order to bring the rotor 1 into a position about the vertical axis, which position is transverse to the direction of the wind at the time, any desired per se known device can be used, such as, e.g., a so-called "wind rose" having its plane of rotation arranged perpendicularly to the plane of rotation of the main rotor. In the embodiment example, for this purpose the entire plant tower 16 together with a foundation plate 21 which supports it is formed pivotable around the vertical axis 22 with respect to the ground 23.

I claim:

1. In a wind-driven power plant comprising a rotor with any desired number of rotor blades operatively connected thereto and rotating during operation in an at least approximately vertical plane, the individual blades of the rotor being attached by means of articulations to a hub, which hub is fastened to the rotor shaft, the hub being mounted in a plant head which is carried by a tower at a height above the ground which is greater than the length of the rotor blades, the improvement comprising the combination of the following features:

a head part pivotally mounted to the tower,
   said rotor is mounted in said head part, the latter swinging into a vertical position when the plant is at standstill,
   articulation means for pivotally operatively mounting said rotor blades to said rotor, said means for swinging said rotor blades around said articulation means when the plant is at standstill to a position which is at least approximately vertical, and
   said rotor blades have radially inner ends, said ends of said rotor blades being kinematically coupled for joint swinging motion with said head part.

2. The wind-driven power plant according to claim 1, further comprising
   an auxiliary-force actuating means for effecting swinging movements of said rotor blades and of said head part out of the standstill position into an operating position, and vice versa.

3. The wind-driven power plant according to claim 1, wherein
   each of said rotor blades comprise several parts,
   blade articulations connect said parts together, respectively,
   said blade articulations in a partial load range are movable perpendicularly to a plane of rotation of said rotor and are resistant to bending and non-rotatable in a direction perpendicular thereto.

4. The wind-driven power plant according to claim 1, wherein
   said rotor comprises a main rotor,
   energy transformers means, secondary rotors means have axles at least in the partial load range lying within a plane of rotation of said main rotor,
said secondary rotors means are arranged on said rotor blades in a region close to their tips for driving said energy transformers means.

5. The wind-driven power plant according to claim 4, wherein
said energy transformers means for being applied with external energy for placing said main rotor in operation by driving said secondary rotors means, the latter constituting propellers.

* * * * *